United States Patent
Rodriguez

(10) Patent No.: US 9,255,837 B2
(45) Date of Patent: Feb. 9, 2016

(54) METHOD FOR IDENTIFYING A FAULT IN AN ELECTRICAL MACHINE

(71) Applicant: ABB Research Ltd., Zurich (CH)

(72) Inventor: Pedro Rodriguez, Vasteras (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/142,407

(22) Filed: Dec. 27, 2013

(65) Prior Publication Data

US 2014/0109679 A1  Apr. 24, 2014

Related U.S. Application Data

(63) Continuation of application No. PCT/EP2012/062526, filed on Jun. 28, 2012.

(30) Foreign Application Priority Data

Jun. 29, 2011  (EP) .................................... 11171814

(51) Int. Cl.
*G01H 17/00* (2006.01)
*G01H 1/00* (2006.01)

(52) U.S. Cl.
CPC ............... *G01H 17/00* (2013.01); *G01H 1/003* (2013.01); *G01H 1/006* (2013.01)

(58) Field of Classification Search
CPC ....... G01H 17/00; G01H 1/003; G01H 1/006; F01D 21/003
USPC ........................................... 73/660, 659, 579
See application file for complete search history.

(56) References Cited

U.S. PATENT DOCUMENTS

| | | | | |
|---|---|---|---|---|
| 4,975,855 A | * | 12/1990 | Miller et al. | ..................... 702/35 |
| 5,520,061 A | | 5/1996 | Thibault et al. | |
| 2004/0243310 A1 | | 12/2004 | Griffin et al. | |
| 2004/0243332 A1 | | 12/2004 | Shen et al. | |
| 2009/0243419 A1 | * | 10/2009 | Humphries | ............. G01M 7/00 310/196 |
| 2010/0116044 A1 | | 5/2010 | Mitaritonna et al. | |
| 2010/0250150 A1 | | 9/2010 | Liang et al. | |

FOREIGN PATENT DOCUMENTS

WO    WO 2011/006528        *  7/2009
WO    WO 2011006528 A1   *  1/2011

OTHER PUBLICATIONS

Gade et al. "How to Determine the modal parameters of simple structures". 2002.*
Sriram et al. "Mode Shape Measurement". Jul. 1992. International Journal of Analytical and Experimental Modal Analysis. v7 n3, pp. 169-178.*
Finley, et al.; "An Analytical Approach to Solving Motor Vibration Problems"; IEEE Transactions on Industry Applications, vol. 36, No. 5, Sep./Oct. 2000; pp. 1467-1480.

(Continued)

*Primary Examiner* — Hezron E Williams
*Assistant Examiner* — Tarun Sinha
(74) *Attorney, Agent, or Firm* — Whitmyer IP Group LLC

(57) ABSTRACT

For identifying a fault in an electrical machine vibration is measured in a plurality of radial directions of the stator. On the basis of the vibration measurements a vibration frequency and a mode shape of the vibration at this frequency is determined. Characteristics of the vibration in terms of both the vibration frequency and the mode shape are used to identify a fault condition of the electrical machine.

15 Claims, 2 Drawing Sheets

(56) References Cited

OTHER PUBLICATIONS

European Search Report Application No. EP 11 17 1814 Completed: Nov. 23, 2011 5 pages.
International Preliminary Report on Patentability Application No. PCT/EP2012/062526 Completed: Sep. 25, 2013 14 pages.
International Search Report & Written Opinion of the International Searching Authority Application No. PCT/EP2012/062526 Completed: Sep. 19, 2012; Mailing Date: Sep. 27, 2012 10 pages.
First Office Action from Republic of China Application No. 201280030679.8 Date of Issue: Aug. 1, 2014 pp. 9.
"Research of Vibration Characteristic and Control System Designing for Switched Reluctance Motor", Wang Zhiping, CMFD, Engineering Science and technology II, vol. 1, Jun. 15, 2012.

* cited by examiner

| Fault<br>Frequency,<br>mode | Broken bar | Dynamic eccentricity | Static eccentricity | Inter-turn short circuit | Inter-coil short circuit |
|---|---|---|---|---|---|
| $f = f_r$<br>$m = 1$ | X | X | | | |
| $f = n \cdot f_r$ or<br>$f = n \cdot f_r \pm 2 \cdot s \cdot f_s$<br>$m = n$<br>$(n = 1, 3, 5, ...)$ | X | | | | |
| $f = 2 \cdot f_s$<br>$m = (2 \cdot p + 1),$<br>$(2 \cdot p - 1)$ | | | X | | |
| $f = 2 \cdot k \cdot f_s$<br>$(k = 1, 2, 3, ...)$<br>$m = 2, 4, 6, ...$ | | | | X | X |
| $f = 2 \cdot f_r,$<br>$m = 2;$<br>$f = 2 \cdot f_s - f_r,$<br>$m = (2 \cdot p - 1);$<br>$f = 2 \cdot f_s + f_r,$<br>$m = (2 \cdot p + 1);$<br>$\vdots$ | | X | | | |
| Vibration amplitude change with load | Proportional | Inverse | No change | Proportional | No change |

$f$ = vibration frequency
$m$ = mode shape
$f_r$ = rotation frequency
$s$ = rotor slip
$f_s$ = supply frequency
$p$ = number of stator pole pairs

*Fig. 3*

METHOD FOR IDENTIFYING A FAULT IN AN ELECTRICAL MACHINE

FIELD OF THE INVENTION

The present invention relates to a method and a system for identifying a fault in an electrical machine.

BACKGROUND OF THE INVENTION

Like any technical device, electrical machines may suffer from different kind of faults, either of mechanical or electrical character. Since electrical machines have a moving element in form of a rotor, many of the most common fault conditions cause vibrations to the machine. It is known that different fault conditions cause different kind of vibrations. In turn, it follows that by knowing what kind of vibration a certain fault condition causes, it is possible to detect the fault by monitoring the vibration characteristics of the machine.

Vibration monitoring has been conventionally used to detect mechanical faults in electrical machines. This monitoring method has been successful e.g. in detecting bearing defects. However, one has not been able to detect electrical faults in a satisfactory way by means of vibration monitoring, even if attempts into this direction have been taken. For example, the conference paper "An analytical approach to solving motor vibration problems" from Finley, W. R. et al. 1999 (D1) discloses a table (Table I) with indicators for identifying both mechanical and electrical faults in an induction motor. The main fault indicators are the frequencies of the vibrations and their sidebands. It requires a lot of empirical interpretation to determine the root source of the vibration with the help of D1, and it is not possible to distinguish between different fault conditions in a satisfactory manner.

SUMMARY OF THE INVENTION

One object of the invention is to provide a method which enables an improved identification of a fault in an electrical machine.

A further object of the invention is to provide a monitoring system which enables an improved identification of a fault in an electrical machine.

These objects are achieved by the method according to the claimed invention.

The invention is based on the realization that a mode shape of a vibration at a particular frequency is an important indicator for many fault conditions. In the prior art, a mode shape of certain vibration has not been considered as a fault indicator. For example, with the measurement setup disclosed in FIG. 15 of Finley W. R. et al. 1999 (D1) it is not even possible to determine the mode shapes of the different vibration frequencies.

According to a first aspect of the invention, there is provided a method for identifying a fault in an electrical machine having a rotor and a stator. The method comprising the steps of: carrying out a first vibration measurement in a first radial direction of the stator; carrying out a second vibration measurement in a second radial direction of the stator; determining, on the basis of at least one of the first vibration measurement and the second vibration measurement, a first vibration frequency; determining, on the basis of the first vibration measurement and the second vibration measurement, a mode shape of the vibration at the first vibration frequency; and using a combination of the first vibration frequency and the mode shape to identify a fault condition of the electrical machine.

By using a combination of the first vibration frequency and the mode shape as a fault indicator, a more reliable identification of a fault condition is achieved.

According to one embodiment of the invention the method comprises the steps of: carrying out a plurality of vibration measurements in at least three different radial directions of the stator, such as at least four, at least six or at least eight different radial directions of the stator; determining, on the basis of at least one of the plurality of vibration measurements, a first vibration frequency; and determining, on the basis of the plurality of vibration measurements, a mode shape of the vibration at the first vibration frequency. The more measurements there are at different radial directions of the stator, the higher mode numbers can be detected and the better is the reliability of this detection.

According to one embodiment of the invention the fault condition is identified when a vibration amplitude at the first vibration frequency exceeds a predetermined threshold value. It is reasonable to determine a threshold value for the vibration amplitude since very small amplitude vibration is not harmful for the machine, and a false fault condition diagnosis can be thereby avoided.

According to one embodiment of the invention the method comprises the steps of: carrying out vibration measurements with a first load and with a second load of the machine; determining a difference in vibration amplitudes with a first load and with a second load at the first vibration frequency; and using a combination of the first vibration frequency, the mode shape and the difference in vibration amplitudes to identify a fault condition of the electrical machine. By using the difference in vibration amplitudes as an additional fault indicator, distinctions between further fault conditions are enabled and a more reliable identification of a fault condition is achieved.

According to one embodiment of the invention the fault condition is one of the following: a broken rotor bar, dynamic eccentricity, static eccentricity, inter-turn short circuit, inter-coil short circuit. The present method is particularly suitable for identifying the listed fault conditions as clear correlations between the vibration characteristics and the fault conditions can be found.

According to one embodiment of the invention the method comprises the step of: determining, on the basis that the first vibration frequency $f$ and the mode shape m fulfil one of the following conditions: $f=n \cdot f_r$ or $f=n \cdot f_r \pm 2 \cdot s \cdot f_s$ and m=n, wherein n=(1, 3, 5, . . . ), $f_r$=rotation frequency of the motor, s=rotor slip and $f_s$=supply frequency, that a rotor bar is broken. It has been discovered that the mentioned conditions are a reliable fault indicator for a broken rotor bar.

According to one embodiment of the invention the method comprises the step of: determining, on the basis that the first vibration frequency $f$ and the mode shape m fulfil one of the following conditions: $f=2 \cdot f_r$ and m=2; $f=2 \cdot f_s - f_r$ and m=2·p−1; $f=2 \cdot f_s + f_r$ and m=2·p+1, wherein $f_r$=rotation frequency of the motor, $f_s$=supply frequency and p=number of stator pole pairs, that the rotor is dynamically eccentric. It has been discovered that the mentioned conditions are a reliable fault indicator for a dynamic eccentricity of a rotor.

According to one embodiment of the invention the method comprises the step of: determining, on the basis that the first vibration frequency $f$ and the mode shape m fulfil the following conditions: $f=2 \cdot f_s$ and m=2·p+1 or m=2·p−1, wherein $f_s$=supply frequency and p=number of stator pole pairs, that the rotor is statically eccentric. It has been discovered that the mentioned conditions are a reliable fault indicator for a static eccentricity of a rotor.

According to one embodiment of the invention the method comprises the step of: determining, on the basis that the first vibration frequency $f$ and the mode shape m fulfil one of the following conditions: $f=2 \cdot k \cdot f_s$ and m=(2, 4, 6, ... ), wherein k=(1, 2, 3, ... ) and $f_s$=supply frequency, that the stator coils have either an inter-turn short circuit or an inter-coil short circuit. It has been discovered that the mentioned conditions are a reliable fault indicator for either an inter-turn short circuit or an inter-coil short circuit.

According to one embodiment of the invention the method comprises the steps of: carrying out vibration measurements with a first load and with a second load of the machine, the a first load being smaller that the second load; determining a difference in vibration amplitudes with a first load and with a second load at the first vibration frequency; and determining, on the basis that the vibration amplitude increases with an increasing load and that the increase of the vibration amplitude exceeds a predetermined threshold value, that the stator coils have an inter-turn short circuit. It has been discovered that an increasing vibration amplitude with an increasing load is a reliable fault indicator for distinguishing between an inter-turn short circuit and an inter-coil short circuit.

According to one embodiment of the invention the electrical machine is an induction motor. The present method is particularly suitable for identifying fault conditions in induction motors wherein clear correlations between the vibration characteristics and the fault conditions can be found.

According to a second aspect of the invention, there is provided a monitoring system for identifying a fault in an electrical machine having a rotor and a stator. The monitoring system comprises a first sensor arranged to measure vibration in a first radial direction of the stator, and a second sensor arranged to measure vibration in a second radial direction of the stator. A processor receives measurement signals from the first sensor and the second sensor. The processor comprises a first algorithm for detecting from the measurement signals a first vibration frequency and a mode shape of the vibration at the first vibration frequency. The processor further comprises a second algorithm for identifying a fault condition of the electrical machine from the combination of the first vibration frequency and the mode shape. With a monitoring system capable of using a combination of the first vibration frequency and the mode shape as a fault indicator, a more reliable identification of a fault condition is achieved.

According to one embodiment of the invention the monitoring system comprises a plurality of sensors arranged to measure vibration in at least three radial directions of the stator, such as in at least four, in at least six or in at least eight different radial directions of the stator, and the processor receives measurement signals from the plurality of sensors. High number of measurements at different radial directions of the stator allow high mode numbers to be detected with a good reliability.

According to one embodiment of the invention the sensors are accelerometers. Accelerometers are preferable vibration sensors because of their small size and low price.

According to one embodiment of the invention, there is provided an induction motor comprising a monitoring system according to the description hereinabove.

BRIEF DESCRIPTION OF THE DRAWINGS

The invention will be explained in greater detail with reference to the accompanying drawings, wherein

FIG. 3 shows a table listing correlations between certain vibration characteristics and certain fault conditions.

DETAILED DESCRIPTION OF THE INVENTION

Figure 1:
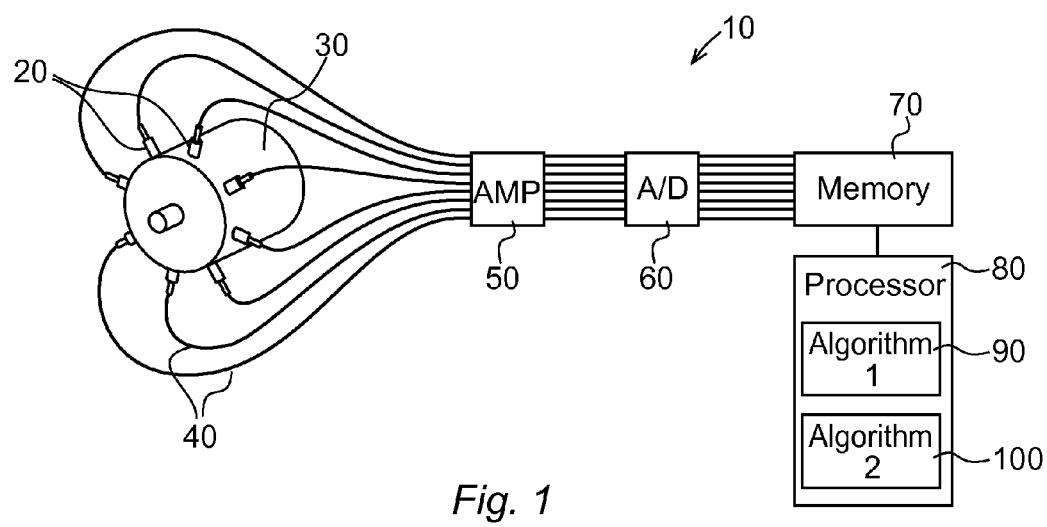
FIG. 1 shows a physical installation according to an embodiment of the invention.

Referring to FIG. 1, a measurement installation 10 for measuring vibrations in an electrical machine is shown. There are eight accelerometers 20 evenly distributed about the circumference of a stator 30. A great number of accelerometers 20 enables the detection of high number modes, so the more accelerometers 20 the better fault identification ability the measurement installation 10 has. However, since we are mainly interested in low number modes (from 1 to 4), eight accelerometers 20 or even less should be enough. The accelerometers 20 are connected by measurement cables 40 to an amplifier 50, and further to an A/D converter 60. The accelerometers 20 give the vibration information in time space i.e. the acceleration as a function of time. In addition, angular position of each accelerometer 20 is known. The measurement results are finally stored in digital form in a computer memory 70 for further processing.

A processor 80 receives and processes the measurement results from the computer memory 70. The processor 80 comprises a first algorithm 90 for detecting from the measurement signals a first vibration frequency and a mode shape of the vibration at the first vibration frequency. The first algorithm 90 comprises a two dimensions Fourier transform explained in more detail below. The processor 80 further comprises a second algorithm 100 for identifying a fault condition of the electrical machine from the combination of the first vibration frequency and the mode shape.

Figure 2:
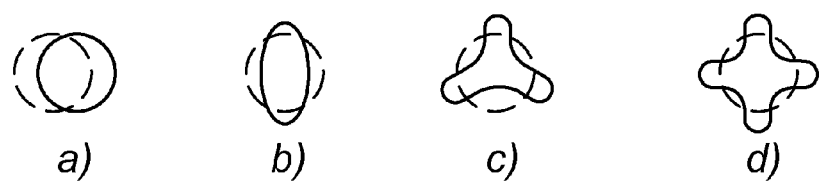
FIG. 2 shows the first four mode shapes of vibration.

Two dimensions Fourier transform, with respect of position (defined by the sensor location) and with respect of time, is applied to the measurement results in order to reveal the mode shapes and the frequencies of the vibrations. Equation for the Fourier transform can be written as:

$$a(\theta, t) = \sum_{m=0}^{\infty} \sum_{n=0}^{\infty} [A_1 \cdot \cos(m \cdot \theta + n \cdot \omega \cdot t) + A_2 \cdot \cos(-m \cdot \theta + n \cdot \omega \cdot t)]$$

wherein a=measured acceleration, θ=angular position along the stator perimeter, t=time, A=calculated coefficients of the acceleration and ω=supply frequency, and wherein m determines the mode shape and n determines the vibration frequency. It is to be understood that detecting indefinite high number modes is not possible since theoretically an indefinite number of accelerometers 20 would be required. In practice, however, only the lowest number modes are of interest, and the number of required accelerometers 20 is respectively low. It is assumed that a skilled person is able to determine the number of accelerometers 20 required for detecting a certain mode shape. Eight accelerometers 20 are considered sufficient for detecting mode shapes up to mode number four. The first four mode shapes 1 to 4 are illustrated in FIG. 2.

Summarizing the detailed description so far, the disclosed measurement installation 10 together with the known mathematical theory enables not only the detection of the vibration frequencies but also the detection of the vibration shapes, the so called mode shapes. These mode shapes are further utilized for identifying fault conditions in the electrical machine.

FIG. 3 shows a table wherein characteristics of certain vibrations in terms of vibration frequencies and mode shapes are listed for certain fault conditions. For example, detecting a vibration at frequency $f=2 \cdot f_s$ would not allow distinguishing between the fault conditions "static eccentricity" and "inter-turn short circuit"/"inter-coil short circuit" since all the three fault conditions exhibit vibration at this frequency. After determining the mode shape of the vibration, however, such distinction would be possible since the shape of the vibration caused by "static eccentricity" is different from that caused by "inter-turn short circuit" or "inter-coil short circuit".

Distinction between "inter-turn short circuit" and "inter-coil short circuit" can further be made by monitoring the behaviour of the vibration amplitude with load of the machine. Namely, it has been discovered that the vibration amplitude increases proportionally with an increasing load in the case of "inter-turn short circuit". Consequently, by measuring the vibration amplitude with two different loads, distinction between the two fault conditions can be made. If the vibration amplitude increases by certain predetermined threshold value, the fault condition will be identified as "inter-turn short circuit". Otherwise, the fault condition will be identified as "inter-coil short circuit".

Descriptions about the fault conditions listed in the table of FIG. 3 are given in the following:

Broken bar—A conductor bar running at a periphery of a rotor in axial direction is broken.

Dynamic eccentricity—The rotor periphery is eccentric in relation to the axis of rotation. The eccentricity varies when the rotor is rotating.

Static eccentricity—The rotor periphery is eccentric in relation to the axis of rotation. The eccentricity remains constant even when the rotor is rotating.

Inter-turn short circuit—A stator coil is short circuited between two turns within one and the same stator coil.

Inter-coil short circuit–Two stator coils are short circuited between each other.

The correlations between vibration characteristics and the fault conditions listed in the table of FIG. 3 are to be considered as examples of such correlations so far discovered by the inventor. It is to be respected that other correlations between the listed vibrations and fault conditions may exist, and that other vibrations and fault conditions than those listed certainly exist with many correlations between them. The disclosed method may therefore be used for identifying the listed fault conditions using an alternative combination of frequency and mode shape of a vibration, and further fault conditions may be identified by using the listed or alternative combinations of frequency and mode shape.

What is claimed is:

1. A method for identifying a fault in an electrical machine having a rotor and a stator, the method comprising the steps of:
    carrying out a first vibration measurement on vibrations of the stator in a first radial direction of the stator;
    carrying out a second vibration measurement on vibrations of the stator in a second radial direction of the stator;
    determining, on the basis of at least one of the first vibration measurement and the second vibration measurement, a first vibration frequency;
    determining, on the basis of the first vibration measurement and the second vibration measurement, a mode shape of the vibration at the first vibration frequency; and
    using a combination of the first vibration frequency and the mode shape to identify a fault condition of the electrical machine.

2. The method according to claim 1, wherein the method comprises the steps of:
    carrying out a plurality of vibration measurements in a plurality of different radial directions;
    determining, on the basis of at least one of the plurality of vibration measurements, a first vibration frequency; and
    determining, on the basis of the plurality of vibration measurements, a mode shape of the vibration at the first vibration frequency.

3. The method according to claim 1, wherein the fault condition is identified when a vibration amplitude at the first vibration frequency exceeds a predetermined threshold value.

4. A method for identifying a fault in an electrical machine having a rotor and a stator, the method comprising the steps of:
    carrying out a first vibration measurement on vibrations of the stator in a first radial direction of the stator;
    carrying out a second vibration measurement on vibrations of the stator a second radial direction of the stator;
    determining, on the basis of at least one of the first vibration measurement and the second vibration measurement, a first vibration frequency;
    determining, on the basis of the first vibration measurement and the second vibration measurement, a mode shape of the vibration at the first vibration frequency;
    carrying out vibration measurements with a first load and with a second load of the machine;
    determining a difference in vibration amplitudes with a first load and with a second load at the first vibration frequency; and
    using a combination of the first vibration frequency, the mode shape and the difference in vibration amplitudes to identify a fault condition of the electrical machine.

5. The method according to claim 1, wherein the fault condition is one of the following: a broken rotor bar, dynamic eccentricity, static eccentricity, inter-turn short circuit, inter-coil short circuit.

6. The method according to claim 1, wherein the method comprises the step of:
    determining, on the basis that the first vibration frequency $f$ and the mode shape m fulfil one of the following conditions: $f=n \cdot f_r$ or $f=n \cdot f_r \pm 2 \cdot s \cdot f_s$ and m=n, wherein n=(1, 3, 5, . . . ), $f_r$=rotation frequency of the motor, s=rotor slip and $f_s$=supply frequency, that a rotor bar is broken.

7. The method according to claim 1, wherein the method comprises the step of:
    determining, on the basis that the first vibration frequency $f$ and the mode shape m fulfil one of the following conditions: $f=2 \cdot f_r$ and m=2; $f=2 \cdot f_s-f_r$ and m=2·p−1; $f=2 \cdot f_s+f_r$ and m=2·p+1, wherein $f_r$=rotation frequency of the motor, $f_s$=supply frequency and p=number of stator pole pairs, that the rotor is dynamically eccentric.

8. The method according to claim 1, wherein the method comprises the step of:
    determining, on the basis that the first vibration frequency $f$ and the mode shape m fulfil the following conditions: $f=2 \cdot f_s$ and m=2·p+1 or m=2·p−1, wherein $f_s$=supply frequency and p=number of stator pole pairs, that the rotor is statically eccentric.

9. The method according to claim 1, wherein the method comprises the step of:
    determining, on the basis that the first vibration frequency $f$ and the mode shape m fulfil one of the following conditions: $f=2 \cdot k \cdot f_s$ and m=(2, 4, 6, . . . ), wherein k=(1, 2, 3, . . . ) and $f_s$=supply frequency, that the stator coils have either an inter-turn short circuit or an inter-coil short circuit.

10. The method according to claim 9, wherein the method comprises the steps of:

carrying out vibration measurements with a first load and with a second load of the machine, the a first load being smaller that the second load;

determining a difference in vibration amplitudes with a first load and with a second load at the first vibration frequency; and determining, on the basis that the vibration amplitude increases with an increasing load and that the increase of the vibration amplitude exceeds a predetermined threshold value, that the stator coils have an inter-turn short circuit.

11. The method according to claim 1, wherein the electrical machine is an induction motor.

12. A monitoring system for identifying a fault in an electrical machine having a rotor and a stator, the monitoring system comprising:
   a first sensor arranged to measure vibrations of the stator in a first radial direction of the stator,
   a second sensor arranged to measure vibrations of the stator in a second radial direction of the stator,
   a processor receiving measurement signals from the first sensor and the second sensor, the processor comprising a first algorithm for detecting from the measurement signals a first vibration frequency and a mode shape of the vibration at the first vibration frequency, and the processor further comprising a second algorithm for identifying a fault condition of the electrical machine from the combination of the first vibration frequency and the mode shape.

13. The monitoring system according to claim 12, wherein the monitoring system comprises a plurality of sensors arranged to measure vibration at a plurality of radial directions of the stator, and the processor receives measurement signals from the plurality of sensors.

14. The monitoring system according to claim 12, wherein the sensors are accelerometers.

15. An induction motor comprising a monitoring system according to claim 12.

* * * * *